United States Patent [19]

Diepeveen et al.

[11] Patent Number: 4,682,029

[45] Date of Patent: Jul. 21, 1987

[54] STEREOSCOPIC INFRARED IMAGER HAVING A TIME-SHARED DETECTOR ARRAY

[75] Inventors: Neal Diepeveen, Fair Lawn; Robert E. Bastian, Wyckoff, both of N.J.

[73] Assignee: Magnavox Government and Industrial Electronics Company, New York, N.Y.

[21] Appl. No.: 790,276

[22] Filed: Oct. 22, 1985

[51] Int. Cl.⁴ .................................................. G01J 5/08
[52] U.S. Cl. .................................... 250/330; 250/332; 250/334; 250/347
[58] Field of Search .................... 352/63; 250/334, 333, 250/332, 331, 330, 347; 350/137, 131; 358/113, 88, 3

[56] References Cited

U.S. PATENT DOCUMENTS

| | | | |
|---|---|---|---|
| 3,971,933 | 7/1976 | Adamson, Jr. | 250/213 VT |
| 4,037,921 | 7/1977 | Cox | 350/36 |
| 4,070,763 | 1/1978 | Carts, Jr. | 33/241 |
| 4,124,798 | 11/1978 | Thompson | 250/213 VT |
| 4,132,889 | 1/1979 | Groeneweg | 250/213 VT |
| 4,222,065 | 9/1980 | Pusch | 358/113 |
| 4,232,222 | 11/1980 | Deltrap | 250/333 |
| 4,266,129 | 5/1981 | Versteeg et al. | 250/330 |
| 4,383,741 | 5/1983 | Vogl et al. | 350/538 |
| 4,450,479 | 5/1984 | Horne | 358/113 |
| 4,463,258 | 7/1984 | Horne | 250/334 |
| 4,466,748 | 8/1984 | Needham | 374/129 |
| 4,475,039 | 10/1984 | Christiansen et al. | 250/334 |
| 4,574,197 | 3/1986 | Kliever | 250/334 |

Primary Examiner—Janice A. Howell
Assistant Examiner—Constantine Hannaher
Attorney, Agent, or Firm—Marc D. Schechter

[57] ABSTRACT

A stereoscopic infrared imager includes optics for producing infrared images of two different views of an infrared scene. A scanning mirror alternately scans the two infrared images across a single infrared detector array. The detector array modulates a light source array to produce a visible image of the scanned part of the infrared scene. Optics are provided for producing visible images of the light source array at the positions of the eyes of the observer. A second scanning mirror alternately scans the image of the light source array across the two eyes of the observer in order to construct full visible images of the scene.

16 Claims, 5 Drawing Figures

STEREOSCOPIC INFRARED IMAGER HAVING A TIME-SHARED DETECTOR ARRAY

BACKGROUND OF THE INVENTION

The invention relates to stereoscopic infrared imagers. In such imagers, two visible images are produced to correspond to two shifted views of an infrared scene. By providing the imager with two displaced optical channels, the observer can more easily judge distances from the observer to observed objects.

Conventional stereoscopic infrared imagers provide two optical channels by providing two complete infrared imagers. Such stereoscopic infrared imagers have two complete sets of input optics, scanners, detectors, amplifiers, displays, and output optics. Such duplication results in a device which is large, heavy, expensive to manufacture, and expensive to maintain.

SUMMARY OF THE INVENTION

It is an object of the invention to provide a stereoscopic infrared imager in which the two optical channels share as many components as possible. By sharing components, the imager can be made smaller, lighter, and less expensive to manufacture and maintain.

A device for producing a stereoscopic visible image of an invisible radiation (for example infrared radiation) scene according to the invention includes means for producing a first invisible radiation image of the scene viewed from a first viewing position, and means for producing a second invisible radiation image of the scene viewed from a second viewing position spaced from the first viewing position. A radiation detector is provided for detecting the invisible radiation images. In order to detect both invisible radiation images of the scene with a single radiation detector, means are provided for alternately scanning the first and second invisible radiation images across the detector.

The stereoscopic imager further includes a light source and means for driving the light source to produce visible light having an intensity proportional to the intensity of the infrared radiation incident on the detector. Means are provided for producing a first visible image of the light source in a field of view at a third viewing position, and means are provided for producing a second visible image of the light source in a field of view at a fourth viewing position spaced from the third viewing position.

In order to produce the two different spaced-apart images of the single light source, means are provided for alternately scanning the first visible image across the first field of view and the second visible image across the second field of view. Moreover, in order to assure that the first visible image corresponds to the first invisible radiation image, and that the second visible image corresponds to the second invisible radiation image, means are provided for synchronizing the starting time and the scan rate of the visible scanning means with the starting time and the scan rate of the invisible radiation scanning means.

As mentioned above, the invisible radiation is preferably infrared radiation. However, in principle the stereoscopic imager according to the invention can be used to generate visible images corresponding to images in any other radiation band.

In a stereoscopic infrared imager according to the invention, the means for producing the infrared radiation images of the scene may include first and second spaced-apart stationary input mirrors arranged to receive infrared radiation from the scene. First and second lens means are arranged to receive scene radiation reflected from the first and second stationary input mirrors, respectively, and to produce infrared images of the scene in their respective focal planes.

Preferably, both lens means are made up of a single input lens. The infrared scanning means may be a rotating input mirror arranged to receive infrared radiation from the scene after reflection from the first and second stationary input mirrors, and further arranged to alternately reflect radiation from the first and second stationary input mirrors to the input lens. The rotating input mirror may be a mirror prism with three reflective sides.

The means for producing the first and second visible images of the light source may comprise first and second display lens means for focusing light from the light source and first and second spaced-apart stationary display mirrors arranged to receive light from the light source after the light has passed through the display lens means, respectively.

Preferably, both display lens means comprise a single objective lens. The visible scanning means comprises a rotating display mirror arranged to receive light from the light source by way of the objective lens. The rotating display mirror is also arranged to alternately reflect said light to the first and second stationary display mirrors. The rotating display mirror may be a mirror prism with three reflective sides.

In one aspect of the invention, the synchronization means comprises a gear train forming a mechanical linkage between the rotating input mirror and the rotating display mirror.

Preferably, the infrared radiation detector comprises a linear array of infrared radiation detectors arranged in the focal plane of the input lens. The light source comprises a linear array of light emitting diodes, each light emitting diode in the diode array corresponding to one infrared detector in the detector array. Each infrared detector produces an output electrical signal having a magnitude proportional to the intensity of the infrared radiation incident thereon. Each light source produces visible light having an intensity proportional to the magnitude of an input electrical signal applied thereto. The means for driving the light source comprises an array of electric amplifiers having inputs connected to the outputs of the infrared detectors and having outputs connected to the inputs of the light sources.

The means for producing the first and second visible images may further include first and second eyepiece lenses arranged to receive light reflected from the first and second stationary display mirrors, respectively.

DESCRIPTION OF THE PREFERRED EMBODIMENTS

Figure 1:
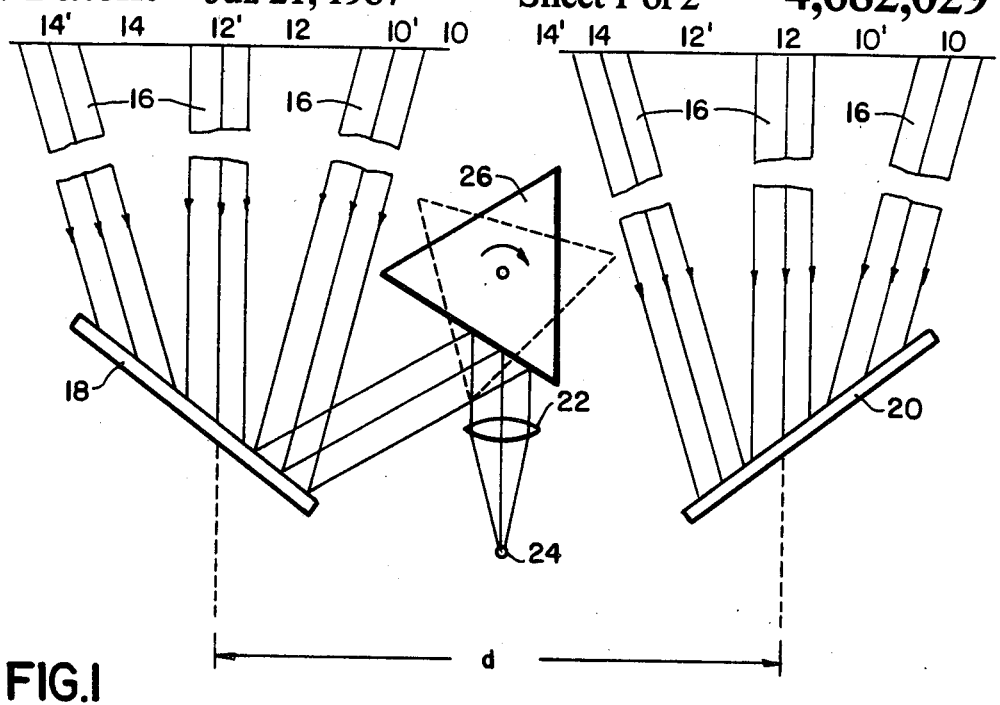
FIG. 1 is a partly schematic, partly top plan view of an infrared scanning and imaging portion of a stereoscopic infrared imager according to the invention.

FIG. 1 shows a portion of a stereoscopic infrared imager according to the invention for scanning an infrared radiation image of the scene across a detector array. The infrared radiation scene is represented in FIG. 1 by the numerals 10, 10', 12, 12', 14, and 14', which denote successive positions in the scene viewed from right to left. Light rays 16 from the scene are incident on stationary input mirrors 18 and 20 which are spaced apart from one another by a distance, d. In conjunction with input lens 22, the stationary input mirrors 18 and 20 produce first and second infrared radiation images of the scene viewed from spaced apart positions.

Thus, the infrared radiation image of the scene viewed from stationary input mirror 18 finds the scene position 12' in the center of the image. In contrast, the infrared radiation image of the scene viewed from the stationary input mirror 20 is shifted slightly to the right and finds the scene position 12 in the center of the image. The larger the spacing, d, between the mirrors 18 and 20, the larger will be the relative shifting between the images and the larger will be the stereoscopic effect.

In order to sense the infrared images of the scene, a radiation detector 24 is provided at the location of the infrared images. In the device shown in FIG. 1, the detector 24 is an array made up of a number of infrared detector elements extending in a direction perpendicular to the plane of the drawing. The infrared detector elements may be, for example, cryogenically-cooled quantum detectors or pyroelectric point detectors.

As described thus far, the stereoscopic imager forms two shifted infrared images of the scene, but has only one detector array. In order to detect both images with a single detector array, a rotating input mirror 26 is provided. Rotating input mirror 26 alternately scans the first and second infrared radiation images across the detector array 24.

As shown in FIG. 1, as the rotating input mirror 26 rotates clockwise, the infrared scene is scanned from right to left across the detector array 24 via stationary input mirror 18. As the rotating input mirror 26 continues to rotate, the inside of the imager (preferably blackened) is scanned across the array until the rotating input mirror 26 reaches the position shown in dotted lines in FIG. 1. At this point, the infrared radiation scene is scanned from right to left across the detector array via stationary input mirror 20.

Figure 2:
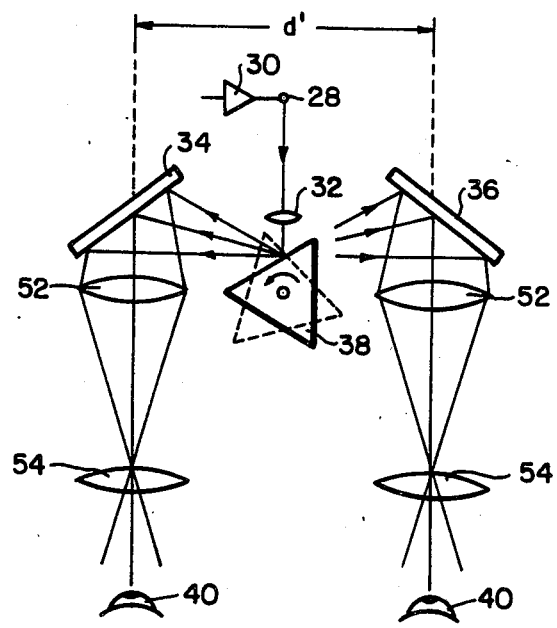
FIG. 2 is a partly schematic, partly top plan view of a visible scanning and imaging portion of a stereoscopic infrared imager according to the invention.

FIG. 2 shows the portion of the stereoscopic imager for generating the stereoscopic visible images. A light source 28 may be, for example, a linear array of light emitting diodes. The array extends in a direction perpendicular to the plane of the drawing.

Amplifier 30 is an array of amplifiers provided for driving the light source array 28 to produce visible light. Each infrared detector in detector array 24 produces an output electrical signal having a magnitude proportional to the intensity of the infrared radiation incident thereon. The output electrical signals from the infrared detectors are input to associated amplifiers in array 30. The output of each amplifier in array 30 drives an associated light source in light source array 28 so that each light source produces visible light having an intensity proportional to the intensity of the infrared radiation incident on the corresponding infrared detector in the detector array 24.

First and second visible images of the light source array 28 are produced in first and second spaced-apart fields of view by an objective lens 32 and by first and second stationary display mirrors 34 and 36. The stationary display mirrors 34 and 36 are separated by a distance, d', which may be the average distance between the two eyes of a human observer.

While the distance, d, between stationary input mirrors 18 and 20 may be equal to the distance, d', between the stationary display mirrors 34 and 36, preferably the distance d exceeds the distance d'. Providing d greater than d' exaggerates the perspective viewed by the observer, thereby compensating for the observer's difficulty in interpreting the visible analog to the infrared scene.

In order to reconstruct two different complete visible images corresponding to the infrared scene from only a single light source array, a rotating display mirror 38 is provided. As the rotating display mirror 38 rotates counterclockwise, an image of the light source array 28 is scanned from right to left across the left eye 40 of an observer. After further rotation of the rotating display mirror 38, the inside of the imager (preferably blackened) is imaged on the observer's eyes. After further rotation of the rotating display mirror 38, an image of the light source array 28 is scanned from right to left across the right eye 42 of the observer.

In order to create the sensation that the observer is viewing two complete and continuous two-dimensional visible images, the mirrors 26 and 38 must be rotated at a sufficiently high angular velocity. For the case where three-sided scanning mirrors are used, the mirrors may be rotated, for example, at 300 revolutions per minute. This will result in a scan rate of 15 frames per second from each optical channel (30 frames per second total).

In the stereoscopic imager described thusfar, the infrared images were shifted relative to each other by using stationary input mirrors 18 and 20, and the visible images were shifted relative to each other by using stationary display mirrors 34 and 36. Scanning was performed by scanning mirrors 26 and 38. While the use of mirrors for shifting and for scanning is preferred, other optical elements could be used in place of these mirrors. For example, the mirrors could be replaced with refracting prisms. Any chromatic aberration produced by the refracting prisms could be corrected with suitable correcting elements.

Moreover, as described thusfar, rotating input mirror 26 and rotating display mirror 38 each have three reflective sides. Alternatively, other rotating mirror arrangements may be used. For example, by providing a scanning prism having a larger number of faces, it is possible to decrease the angular velocity of the mirror for the same frame rate, or conversely it is possible to increase the frame rate and maintain the same angular velocity of the mirror.

Figure 3:
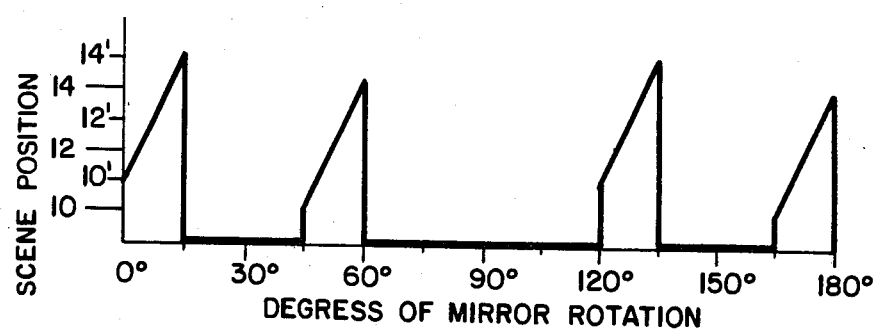
FIG. 3 is a graph of the azimuthal position of the scene being scanned across the detector as a function of the angular rotation of the infrared and visible scanning mirrors.

FIG. 3 graphically shows the scanning of the infrared scene by a stereoscopic imager having a 30° field of view. When the angular position of the rotating input mirror 26 is at zero degrees (the solid-line position shown in FIG. 1), an image of the scene position 10' is produced on the detector array 24 via input mirror 18. As the rotating input mirror 26 rotates clockwise, the infrared image of the scene is scanned across the detector array 24 until an image of the scene position 14' is produced on the detector array 24 when the angular position of the rotating input mirror 26 is 15°. Thus, while the rotating input mirror 26 rotates 15°, the field of view of the stereoscopic imager is 30°. The field of view may be either higher or lower than 30°, as may be required.

While the rotating input mirror 26 rotates from 15° to 45°, an image of the blackened interior (not shown) of the imager is produced on the detector array 24. Thereafter, at 45° an image of the scene position 10 is produced on the detector array 24 via the stationary input mirror 20. From 45° to 60°, the image of the scene is scanned across the detector array 24 until an image of the scene position 14 is produced on the detector array 24. Thereafter, an image of the darkened interior of the imager is produced on the detector array from 60° to 120°. Since the rotating input mirror 26 has three reflective surfaces, this cycle is repeated three times for each rotation of the rotating input mirror 26.

Figure 4:
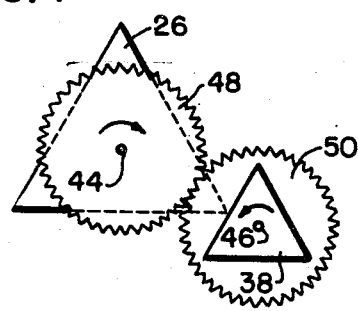
FIG. 4 is a top plan view of a portion of a stereoscopic infrared imager according to the invention for synchronizing the rotations of the infrared and visible scanning mirrors.

In order to assure that the visible images reconstructed by the components shown in FIG. 2 correspond to the infrared images of the scene, the starting time and scan rate of the rotating display mirror 38 must be synchronized with the starting time and the scan rate of the rotating input mirror 26. One such arrangement for synchronizing the rotating input and display mirrors is shown in FIG. 4. The rotating input mirror 26 rotates on a shaft 44 while the rotating display mirror 38 rotates on a shaft 46. The rotating input mirror 26 is arranged in plane below the plane of the rotating display mirror 38 so that the formation of the infrared images and the formation of the visible images will not interfere with each other.

As noted above, the starting time and scan rate (rate of rotation) of the rotating input mirror 26 and the rotating display mirror 38 must be synchronized while rotating the input and display mirrors in opposite directions. This is accomplished by providing a gear train in a plane between the planes of the rotating input mirror 26 and the rotating display mirror 38. The gear train includes gears 48 and 50. The gears have the same number of teeth per revolution so that the rotating mirrors will rotate at the same angular velocity. Moreover, the rotating mirrors are aligned so that the visible and infrared scans start at the same time.

An electric motor may be connected to either shaft 44 or shaft 46 in order to rotate both mirrors 26 and 38.

The starting time and scan rate of the rotating input mirror 26 and rotating display mirror 38 can, alternatively, be synchronized in other ways. For example, a single scanning mirror could be used for scanning both the infrared scene and the light source. The lower portion of the rotating mirror could be used for scanning the infrared scene, and the upper portion of the rotating mirror could be used for scanning the light source. A reversing lens could be placed between the input lens 22 and the detector array 24 (FIG. 1) to compensate for the rotation of both the rotating input mirror and the rotating display mirror in the same direction.

Figure 5:
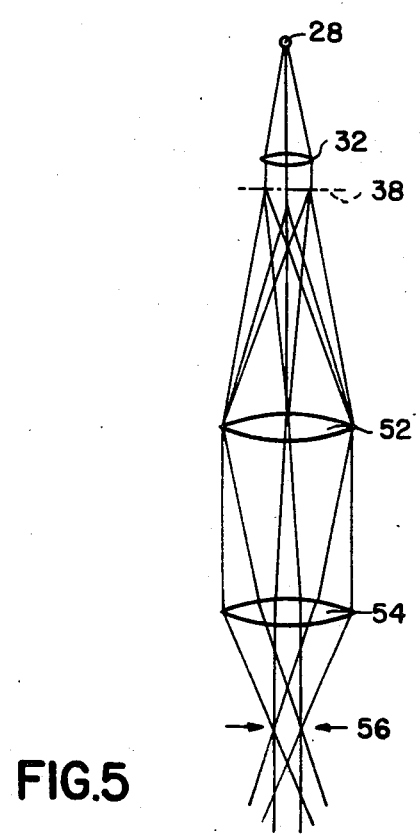
FIG. 5 is a schematic diagram of a lens system for producing a visible image of the light source in the infrared imager according to the invention.

FIG. 5 shows a lens system which can be used for producing a visible image of the light source array 28. Light from the light source array 28 is focused by the objective lens 32. After reflection from rotating display mirror 38, a field lens 52 is provided to locate the exit pupil 56 at the expected location of the observer's eye. Finally, the eyepiece lens 54 is provided to collimate the image for the eyes.

What is claimed:

1. A device for producing a stereoscopic visible image of an invisible radiation scene, said device comprising:
    means for producing a first invisible image of the scene viewed from a first viewing position;
    means for producing a second invisible radiation image of the scene viewed from a second viewing position spaced from the first viewing position;
    a radiation detector for detecting the invisible radiation images;
    means for alternately scanning the first and second invisible radiation images across the detector, each scan having a starting time and a scan rate;
    a light source;
    means for driving the light source to produce visible light having an intensity proportional to the intensity of the invisible radiation incident on the detector;
    means for producing a first visible image of the light source in a first field of view at a third viewing position;
    means for producing a second visible image of the light source in a second field of view at a fourth viewing position spaced from the third viewing position;
    means for alternately scanning the first visible image across the first field of view and the second visible image across the second field of view, each scan having a starting time and a scan rate; and
    means for synchronizing the starting time and scan rate of the visible scanning means with the starting time and scan rate of the invisible radiation scanning means.

2. A device as claimed in claim 1, characterized in that the invisible radiation is infrared radiation.

3. A device as claimed in claim 2, characterized in that the means for producing the first infrared radiation image of the scene comprises:
    a first stationary input mirror arranged to receive infrared radiation from the scene and to reflect said infrared radiation; and
    first lens means arranged to receive scene radiation reflected from the first stationary input mirror, said first lens means producing an infrared image of the scene in a focal plane.

4. A device as claimed in claim 3, characterized in that the means for producing the second infrared radiation image of the scene comprises:
    a second stationary input mirror arranged to receive infrared radiation from the scene and to reflect said infrared radiation, said second stationary input mirror being spaced from the first stationary input mirror; and
    second lens means arranged to receive scene radiation reflected from the second stationary input mirror, said second lens means producing an infrared image of the scene in a focal plane.

5. A device as claimed in claim 4, characterized in that:
    both lens means comprise a single input lens; and
    the infrared scanning means comprises a rotating input mirror arranged to receive infrared radiation from the scene after reflection from the first and second stationary input mirrors, and further arranged to alternately reflect radiation from the first and second stationary input mirrors to the input lens.

6. A device for producing a stereoscopic visible image of an infrared radiation scene, said device comprising:
- means for producing a first infrared image of the scene viewed from a first viewing position;
- means for producing a second infrared radiation image of the scene viewed from a second viewing position spaced from the first viewing position;
- a radiation detector for detecting the infrared radiation images;
- means for alternately scanning the first and second infrared radiation images across the detector, each scan having a starting time and a scan rate;
- a light source;
- means for driving the light source to produce visible light having an intensity proportional to the intensity of the infrared radiation incident on the detector;
- means for producing a first visible image of the light source in a first field of view at a third viewing position;
- means for producing a second visible image of the light source in a second field of view at a fourth viewing position spaced from the third viewing position;
- means for alternately scanning the first visible image across the first field of view and the second visible image across the second field of view, each scan having a starting time and a scan rate; and
- means for synchronizing the starting time and scan rate of the visible scanning means with the starting time and scan rate of the infrared radiation scanning means;
- characterized in that the means for producing the first and second infrared radiation images of the scene comprise:
- a first stationary input mirror arranged to receive infrared radiation from the scene and to reflect said infrared radiation;
- a second stationary input mirror arranged to receive infrared radiation from the scene and to reflect said infrared radiation, said second stationary input mirror being spaced from the first stationary input mirror; and
- a single input lens arranged to receive scene radiation reflected from the first and second stationary input mirrors, said input lens producing an infrared image of the scene in a focal plane; and
- characterized in that the infrared scanning means comprises a rotating mirror prism with their reflective sides arranged to receive infrared radiation from the scene after reflection from the first and second stationary input mirrors, and further arranged to alternately reflect radiation from the first and second stationary input mirrors to the input lens.

7. A device as claimed in claim 6, characterized in that the means for producing the first visible image of the light source comprises:
- first display lens means for focusing light from the light source; and
- a first stationary display mirror arranged to receive light from the light source after it has passed through the first display lens means.

8. A device as claimed in claim 7, characterized in that the means for producing the second visible image of the light source comprises:
- second display lens means for focusing light from the light source; and
- a second stationary display mirror arranged to receive light from the light source after it has passed through the second display lens means, said second stationary display mirror being spaced from the first stationary display mirror.

9. A device as claimed in claim 8, characterized in that:
- both display lens means comprise a single objective lens;
- the visible scanning means comprises a rotating display mirror arranged to receive light from the light source by way of the objective lens, said rotating display mirror being arranged to alternately reflect said light to the first and second stationary display mirrors.

10. A device as claimed in claim 9, characterized in that the rotating display mirror comprises a mirror prism with three reflective sides.

11. A device as claimed in claim 10, characterized in that the synchronization means comprises a gear train forming a mechanical linkage between the rotating input mirror and the rotating display mirror.

12. A device as claimed in claim 11, characterized in that the infrared radiation detector comprises a linear array of infrared radiation detectors arranged in the focal plane of the input lens.

13. A device as claimed in claim 12, characterized in that the light source comprises a linear array of light emitting diodes, each light emitting diode in the diode array corresponding to one infrared detector in the detector array.

14. A device as claimed in claim 13, characterized in that:
- each infrared detector produces an output electrical signal having a magnitude proportional to the intensity of the infrared radiation incident thereon;
- each light source has an input and produces visible light having an intensity proportional to the magnitude of an input electrical signal applied thereto; and
- the means for driving the light source comprises an array of electric amplifiers, each amplifier having an input connected to the output of an associated infrared detector and having an output connected to the input of an associated light source.

15. A device as claimed in claim 14, characterized in that:
- the means for producing the first visible image of the light source further comprises a first eyepiece lens arranged to receive light source light reflected from the first stationary display mirror; and
- the means for producing the second visible image of the light source further comprises a second eyepiece lens arranged to receive light source light reflected from the second stationary display mirror.

16. A device for producing a stereoscopic visible image of an invisible radiation scene, said device comprising:
- means for producing a first invisible image of the scene viewed from a first viewing position;
- means for producing a second invisible radiation image of the scene viewed from a second viewing position spaced from the first viewing position;
- a radiation detector for detecting the invisible radiation images;

means for alternately scanning the first and second invisible radiation images across the detector, each scan having a starting time and a scan rate;

a light source;

means for driving the light source to produce visible light having an intensity proportional to the intensity of the invisible radiation incident on the detector;

means for producing a first visible image of the light source in a first field of view at a third viewing position;

means for producing a second visible image of the light source in a second field of view at a fourth viewing position spaced from the third viewing position;

means for alternately scanning the first visible image across the first field of view and the second visible image across the second field of view, each scan having a starting time and a scan rate; and means for synchronizing the starting time and scan rate of the visible scanning means with the starting time and scan rate of the invisible radiation scanning means;

characterized in that:

the invisible radiation scanning means comprises a rotating input mirror;

the visible scanning means comprises a rotating display mirror; and the synchronization means comprises a gear train forming a mechanical linkage between the rotating input mirror and the rotating display mirror.

* * * * *